Feb. 23, 1937. J. A. McGREW 2,072,007
BRAKE SHOE KEY
Filed June 21, 1935
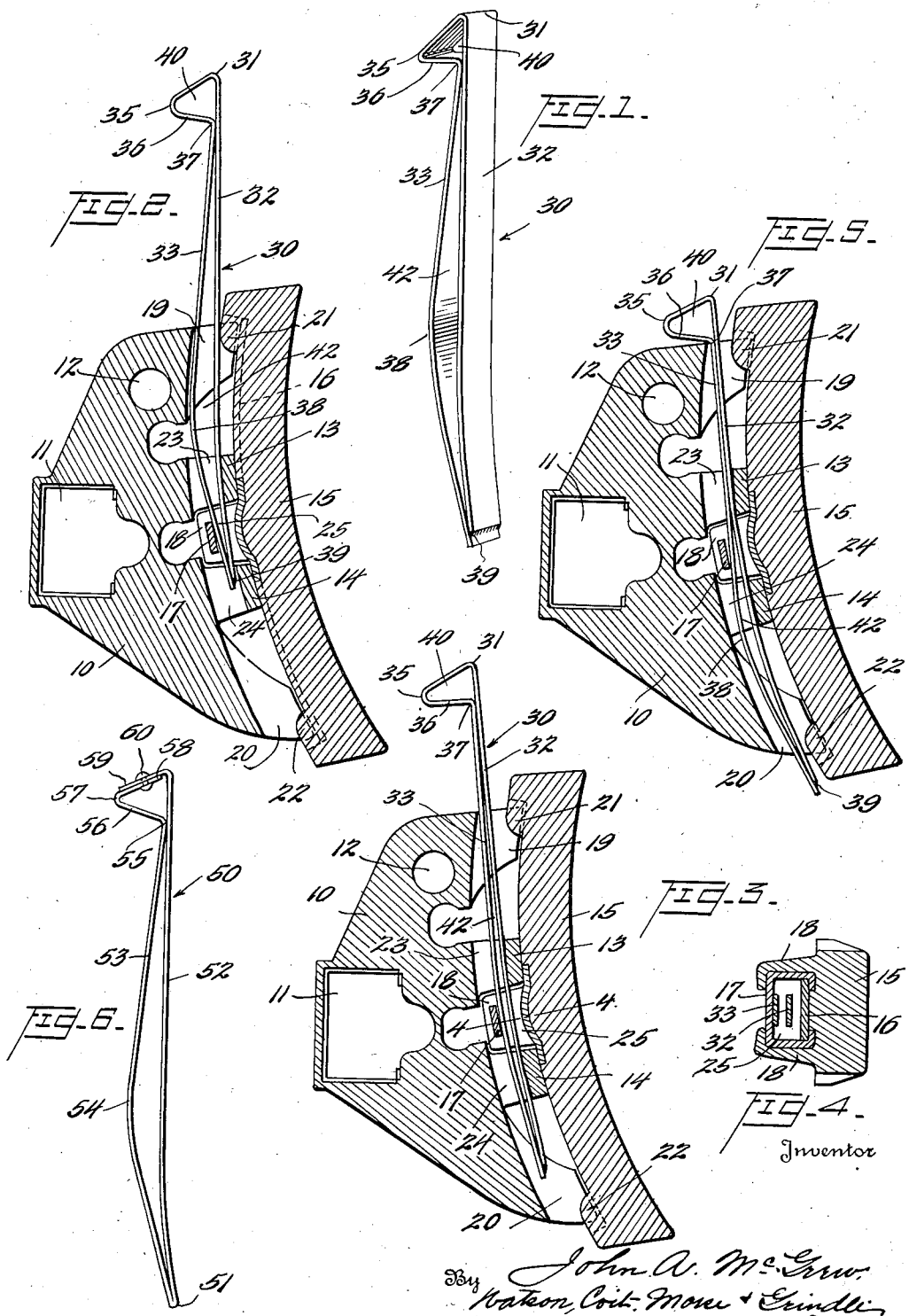

Patented Feb. 23, 1937

2,072,007

UNITED STATES PATENT OFFICE 2,072,007

BRAKE SHOE KEY

John A. McGrew, Albany, N. Y.

Application June 21, 1935, Serial No. 27,803

17 Claims. (Cl. 188—243)

This invention relates to brakes for railway rolling stock and more particularly to means for detachably connecting the brake shoes to the brake blocks or heads.

The general object of the invention is to provide novel and improved means of this character which will serve to resiliently secure the brake shoes and heads together so as to absorb shocks and impacts sustained during operation of the brakes and to prevent excessive wear on the contacting portions of the head and shoe. Another object of the invention is to provide especially effective means for preventing accidental displacement of the fastening means while rendering them readily removable for the repair or replacement of the brake shoes.

At the present time the most widely employed brake shoe and head connecting means comprises a comparatively rigid tapered key, which is inserted through the registering apertures in the brake head and brake shoe lugs. This type of connection has proved inefficient in practice in that it permits relative movement between the brake head and brake shoe thereby causing rapid wear of these parts. This is especially true in the case of the brake head, the repair or replacement of which is a considerable item of expense. The relative movement referred to is caused largely by impact during operation and can be eliminated only by means of a resilient fastening of the proper shock absorbing quality.

Several attempts have been made to provide a resilient brake shoe key of the proper qualifications, but the proposals to this end have not been entirely successful and have generally involved the use of a key of complicated construction and unnecessarily great weight. On the other hand, it is an object of the present invention to provide a spring key which presents a greatly increased resistance to deformation, being at the same time of relatively light weight. The present key is also adapted to be employed in connection with brake shoes and heads of the conventional type without modification.

In its preferred embodiment, the present invention contemplates the provision of a resilient brake shoe key which is provided with two bowed or looped portions, one of which is adapted to be inserted through the corresponding openings in the brake shoe and brake head lugs and to be distorted during such insertion. The distortion of the inserted loop is transmitted to the other loop and thus a double resistance is brought into effect against shocks and impacts encountered during operation and also against withdrawal from working position. Between the two loops, there is preferably provided a point of frictional contact between two relatively movable portions of the key, which provides additional resistance to deformation.

Other objects and features of novelty will be apparent from the following specification when read in connection with the accompanying drawing in which one embodiment of my invention is illustrated by way of example.

In the drawing:

Figure 1 is a view in perspective of a brake shoe key embodying the principles of my invention;

Figure 2 is a view chiefly in vertical central cross section showing an initial stage of the application of the brake key to a brake shoe and head;

Figure 3 is a similar view showing an intermediate stage of the application of the brake key;

Figure 4 is a view in substantially horizontal cross section taken on line 4—4 of Figure 3;

Figure 5 is a view similar to Figures 2 and 3 in which the key is shown in its final applied position; and Figure 6 is a view in side elevation of a modified form embodying the principles of my invention.

Referring now more particularly to Figures 2, 3 and 5 of the drawing, the reference numeral 10 indicates a conventional brake head provided with an opening 11 for the reception of the brake beam and another opening 12 for the brake hanger or stirrup. The curved forward face of the brake head 10 is provided intermediately with the forwardly projecting hollow lugs 13 and 14 against which the brake shoe 15 lies. The shoe 15 may be of any suitable or conventional composition and is provided with a backing strip or insert 16 which is centrally embraced by the strap 17 which forms the chief component of the rearwardly projecting attaching lug 18. This lug 18 is adapted to extend between the brake head lugs 13, 14 and to interfit more or less snugly therewith as clearly shown in the figures of drawing referred to.

The forward face of the brake head is provided adjacent its upper and lower ends with spaced toes 19 and 20 which are adapted to receive between them raised portions 21 and 22 formed upon the rear surface of the shoe in order to prevent any rotary displacement of the shoe with relation to the head.

The spaces between these upper and lower pairs of toes 19 and 20 and the openings 23 and 24 through the brake head lugs 13 and 14 respectively, provide a channel or passageway of a gently curving contour for the reception of the brake shoe fastening means. The opening or aperture 25 formed in the brake shoe lug 18 registers partially with the openings 23 and 24 and thus with the channel or passageway referred to.

All of the elements which have thus far been described are well known and constitute the common or conventional construction in use at the present time. In prior constructions, however, the comparatively rigid and solidly constructed key was adapted to be inserted downwardly through the openings 23, 24 and 25 and wedged tightly therein, the forward face of the key engaging the inner surfaces of the lugs 13 and 14 and the rear surface of the key bearing against the inner surface of the brake shoe lug 18. In the present case, however, instead of the rigid tapered key which, after slight wear has occurred, permitted relative movement of the head and shoe, either of the resilient keys indicated generally by the reference characters 30 and 50, and illustrated in perspective in Figures 1 and 6 of the drawing, are employed.

These brake shoe keys are formed with a plurality of loops, the distortion of one of which causes a distortion of the other and thus provides a double resistance to impact or displacement. These loops or compression portions may be embodied in the keys in various ways, and in practice the keys may be constructed integrally or in a plurality of connected parts or sections. In one of the preferred forms illustrated in the drawing, the key 30 is formed of an elongated strip of spring metal bent at an intermediate point 31 so as to provide two arms 32 and 33 which extend in the same general direction and are spaced at various distances from each other in accordance with the contour of the key to be presently described. The forward arm 32 may be approximately straight or formed with a gentle curvature as illustrated the rear arm 33 diverging from the arm 32 at the bend 31, being bent relatively sharply at the point 35 so as to extend forwardly as at 36, and then again bent at 37 at approximately a right angle. The angular portion formed at 37 is adapted in all positions of the key to contact with the rear surface of the front arm 32. From the point 37 the rear arm 33 is bowed rearwardly away from the arm 32 as at 38 and then forwardly again to the point where the end portions of the arms 32 and 33 are welded or otherwise rigidly secured together as at 39. It will be seen that in its normal unstressed condition as shown in Figures 1 and 2, the key is provided with a head loop 40 at the upper end thereof and a narrow elongated body loop 42 which comprises the greater portion of the key.

Upon inserting the lower end of the key into the openings or apertures in the lugs of the brake shoe and head, the key will enter these elements freely up to the position illustrated in Figure 2 wherein the lower forward face of the forward arm 32 of the key contacts with the inner surfaces of the brake head lugs 13 and 14 and the lower rear surface of the rear arm 33 contacts with the inner surface of the brake shoe lug 18. Continued downward pressure upon the key causes a compression of the body loop portion 42 and a deformation of the key to the maximum extent shown in Figure 3 of the drawing in which the arms 32 and 33 have been brought almost into contact and the bend 37 in the rear arm 33 has moved upwardly along the rear surface of the forward arm 32 to the position shown, thus causing a deformation of the head loop 40 and lessening the degree of angularity of the bend 35. Relative longitudinal movement of the ends of the arms 32 and 33 is, of course, prevented by the rigid connection afforded by the weld 39. It will thus be seen that in addition to the normal resistance to deformation possessed by the body loop portion 42 of the key, there is brought into play the resilience of the head loop 40 and the friction developed at the movable fulcrum point 37.

Further downward movement of the key will bring it to its final applied working position illustrated in Figure 5 of the drawing in which the key has resumed, to some extent, its original configuration although still being under considerable compression. The body loop 42 has expanded below the brake shoe lug 18 and the head loop 40 has also expanded with a corresponding downward movement of the contact portion 37. It will thus be readily seen that in its working position the key 30 provides a very effective resilient member well adapted to resist the shocks and impacts attendant to operation of the brake rigging and also to effectively resist accidental displacement or removal of the key, such removal necessitating the distortion of the key illustrated in Figure 3 of the drawing.

In Figure 6 of the drawing there is illustrated an alternative form of key made in accordance with the principles of my invention and adapted to operate in the same way as has just been described in connection with the embodiment illustrated in the earlier figures of the drawing. This key is designated generally by the reference numeral 50 and is seen to comprise a strip of metal bent sharply intermediate its length as at 51 to provide two arms 52 and 53. The sharply bent portion 51 corresponds to the welded junction 39 of the arms in the key designated at 30 but provides an integral connection at the lower end of the key. The arm 53 is bowed away from the substantially straight arm 52 as at 54 and returns to contact with the arm 52 at the point 55. The arm 53 then diverges sharply from the arm 52 to form the short member 56 which is then again bent sharply at 57 and terminates in a portion 58 which is directed toward the plane of the arm 52. At the upper end of the key the straight arm 52 is bent rearwardly and terminates in the portion 59 which overlaps with the end portion 58 of the other arm. These overlapping portions are rigidly secured together as for example by means of the rivet 60. It will be understood that the effective contour of this embodiment is the same as the one first described and that the construction differs only in joining the ends of the arms of the key at the head portion rather than at the inserted end. There is thus provided in this embodiment as well as in the welded constructions, an endless or continuous member which is bent into substantially the form of a figure 8 to provide the cooperating loops forming an important feature of the present invention.

The double resistance feature described in connection with the present invention has the effect of producing a greater degree of spring resistance with a key of lighter cross section, thus reducing the necessary weight of the key and effecting a corresponding economy in manufacture.

It will also be understood that various changes and modifications may be made in the exemplary embodiments illustrated and described herein without departing from the scope of the invention as defined in the following claims.

Having thus described the invention, what is claimed as new and desired to be secured by Letters Patent is:

1. In combination with a brake shoe and a brake head having interfitting lugs with substantially aligned apertures therein, fastening means for securing said shoe to said head comprising a key passing through said apertures and wedgingly engaging said lugs, said key being provided with a plurality of compressible portions spaced longitudinally of the key which cooperate with each other to resiliently resist impacts between said head and shoe.

2. In combination with a brake shoe and a brake head having interfitting lugs with substantially aligned apertures therein, fastening means for securing said shoe to said head comprising a key passing through said apertures and engaging said lugs, said key being provided with a plurality of closed loop portions which cooperate to resiliently resist impacts between said head and shoe.

3. In combination with a brake shoe and a brake head having interfitting lugs with substantially aligned apertures therein, fastening means for securing said shoe to said head comprising a key passing through said apertures and engaging said lugs, said key being provided with a plurality of loop portions, one of said portions being elongated and occupying the apertures in said lugs and adapted to be compressed during insertion, the other of said loop portions cooperating with said first named portion to provide additional resistance to compression.

4. In combination with a brake shoe and a brake head having interfitting lugs with substantially aligned apertures therein, fastening means for securing said shoe to said head comprising a key passing through said apertures and engaging said lugs, said key comprising a continuous member formed of spring metal and bent to provide two loops substantially in the form of a figure 8, one of the loops occupying the apertures within said lugs and exerting a resilient force opposing shocks occurring between said shoe and head, and the other loop cooperating with said first named loop to provide additional resistance to shock.

5. A brake shoe key provided with an end loop and a pair of legs extending therefrom, one of said legs being approximately straight and the other bowed, said legs being secured together at their ends.

6. A brake shoe key provided with a closed loop at one end and a pair of legs extending therefrom, said legs being secured together at their ends.

7. A brake shoe key provided with a closed loop at one end and a pair of legs extending therefrom, said legs being spaced apart intermediate their length and secured together at their ends.

8. A brake shoe key provided with a closed loop at one end and a pair of legs extending therefrom, said legs being spaced apart intermediate their length and secured together at their ends, contacting portions of said legs at the point where they join said loop being relatively slidable.

9. A brake shoe key provided with a closed loop at one end thereof, a pair of legs providing a bowed portion, said bowed portion being compressible during application of the brake shoe key, said closed end loop being compressible as a consequence of the compression of said bowed portion.

10. A brake shoe key provided with an end loop and a pair of legs providing a bowed body portion, said bowed portion being compressible transversely during application of the brake shoe key, said end loop being compressible in a direction longitudinally of said key as a consequence of the compression of said bowed portion.

11. A brake shoe key provided with two arms, spaced at one end of said key to form a closed loop, said arms contacting with each other at the point of closure of said loop to provide a sliding fulcrum, the arms extending from this point in normally spaced relation to provide a bowed portion and secured together against relative longitudinal movement at the opposite end of said key, whereby compression of said bowed portion is resisted not only by the inherent resilience of the same but by the sliding of the fulcrum and the consequent distortion of said end loop.

12. A brake shoe key comprising two arms spaced at one end of said key to form a closed loop and extending from the point of closure of said loop in spaced relation to provide a bowed portion, the ends of said arms being welded together at the opposite end of said key.

13. A brake shoe key formed of a strip of spring metal bent at an intermediate point to provide a pair of arms, one of said arms being substantially straight, the other of said arms bent to form an end loop, then to contact with said first named arm, then bowed away from said first named arm to form an elongated loop, the ends of said arms being rigidly connected together.

14. A brake shoe key formed of a strip of spring metal bent at an intermediate point to provide a pair of arms, one of said arms being substantially straight, the other of said arms bent to form a longitudinally flattened end loop, then to contact with said first named arm and then bowed therefrom, whereby compression of the elongated loop will cause a further flattening of said end loop.

15. In combination with a brake shoe and brake head having interfitting lugs with substantially aligned apertures therein, fastening means for securing said shoe to said head comprising a key passing through said apertures, said key being provided with two closed loops, one loop being elongated and adapted to enter said lug apertures, the widest portion of said loop after application thereof being at a point beyond the narrowest space between opposite portions of the cooperating lugs, thus requiring transverse compression of said loop in order to withdraw said key, the other of said loops cooperating with the first named loop to assist such compression.

16. A brake shoe key formed of a strip of metal bent at an intermediate point to provide a pair of arms, one of said arms being substantially straight for the greater portion of its length, the other of said arms bowed from said first named arm from said intermediate bend to a point near the end of said arms, the arms being in contact at said point, the second named arm being bent from said point sharply away from said first named arm then back toward said first named arm, and fastening means securing the ends of said arms together.

17. A brake shoe key formed of a strip of metal bent at an intermediate point to provide a pair of arms, said arms forming an elongated bowed loop portion adjacent said bend and extending for the greater portion of the length of said key, a short loop formed by the end portions of said arms, said end portions overlapping, and a fastening element for securing them together.

JOHN A. McGREW.